(12) United States Patent
Nakagawa

(10) Patent No.: US 8,588,239 B2
(45) Date of Patent: Nov. 19, 2013

(54) RELAYING APPARATUS AND PACKET RELAYING APPARATUS

(75) Inventor: Yukihiro Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 12 days.

(21) Appl. No.: 12/340,982

(22) Filed: Dec. 22, 2008

(65) Prior Publication Data

US 2009/0262748 A1   Oct. 22, 2009

(30) Foreign Application Priority Data

Apr. 16, 2008   (JP) ................................. 2008-107177

(51) Int. Cl.
*H04L 12/56* (2011.01)

(52) U.S. Cl.
USPC ........... 370/401; 370/409; 370/416; 370/420; 370/444; 370/455

(58) Field of Classification Search
USPC .......................... 370/415, 416, 419, 420, 421
See application file for complete search history.

(56) References Cited

U.S. PATENT DOCUMENTS

| | | | | |
|---|---|---|---|---|
| 5,859,835 | A * | 1/1999 | Varma et al. | 370/229 |
| 6,188,698 | B1 * | 2/2001 | Galand et al. | 370/412 |
| 6,836,479 | B1 | 12/2004 | Sakamoto et al. | |
| 6,944,182 | B1 | 9/2005 | Amagai et al. | |
| 6,976,096 | B1 * | 12/2005 | Cherukuri et al. | 709/250 |
| 7,349,417 | B2 | 3/2008 | Nakagawa | |
| 7,426,575 | B1 | 9/2008 | Reissfelder et al. | |
| 7,869,441 | B2 | 1/2011 | Sakamoto et al. | |
| 8,073,006 | B2 | 12/2011 | Amagai et al. | |
| 2002/0141423 | A1 * | 10/2002 | Namihira | 370/411 |
| 2002/0181484 | A1 | 12/2002 | Aimoto | |

FOREIGN PATENT DOCUMENTS

| | | |
|---|---|---|
| EP | 1130854 | 9/2001 |
| JP | 11-68784 A | 3/1999 |
| JP | 11-112544 | 4/1999 |
| JP | 2000-232482 A | 8/2000 |
| JP | 2000-324130 A | 11/2000 |
| JP | 2004-166080 | 6/2004 |
| JP | 2004-242335 A | 8/2004 |
| WO | WO-2005-079016 A1 | 8/2005 |

OTHER PUBLICATIONS

European Search Report dated Jul. 23, 2009, from the corresponding European Application.
European official communication dated Dec. 8, 2010 for corresponding European Application No. 08172560.8.
Japanese Office Action mailed Feb. 28, 2012 for corresponding Japanese Application No. 2008-107177, with English-language Translation.

* cited by examiner

*Primary Examiner* — Alvin Zhu
(74) *Attorney, Agent, or Firm* — Fujitsu Patent Center

(57) ABSTRACT

Each transmission port module includes a plurality of queues in association with combinations of a priority and a VLAN number. An accumulated-amount storage unit stores a total size of packets accumulated in queues associated with the same priority. A threshold storage unit stores a threshold of a total packet accumulated amount for each queue. When a packet is received, whether to discard the packet is determined based on a total packet accumulated amount stored in the accumulated-amount storage unit in association with a priority set for the packet and the threshold stored in the threshold storage unit in association with a storage-destination queue of the packet.

6 Claims, 13 Drawing Sheets

FIG.4

| MAC ADDRESS | PORT NUMBER |
|---|---|
| 00:01:02:03:04:05 | 12a |
| 00:01:02:03:04:06 | 12b |
| 00:01:02:03:04:07 | 12c |
| ⋮ | ⋮ |

| VLAN NUMBER | PRIORITY | MEMBER PORT NUMBER | QID | SPECIFIED THRESHOLD |
|---|---|---|---|---|
| 1 | 0 | 11a, 12a, 12b | 0 | TH0 |
| 1 | 1 | 11a, 12a, 12b | 0 | TH0 |
| 1 | 2 | 11a, 12a, 12b | 0 | TH1 |
| 1 | 3 | 11a, 12a, 12b | 0 | TH1 |
| 1 | 4 | 11a, 12a, 12b | 0 | TH2 |
| 1 | 5 | 11a, 12a, 12b | 0 | TH2 |
| 1 | 6 | 11a, 12a, 12b | 0 | TH3 |
| 1 | 7 | 11a, 12a, 12b | 0 | TH3 |
| 2 | 0 | 11b, 11c, 12b | 1 | TH2 |
| 2 | 1 | 11b, 11c, 12b | 1 | TH2 |
| 2 | 2 | 11b, 11c, 12b | 1 | TH2 |
| 2 | 3 | 11b, 11c, 12b | 1 | TH4 |
| 2 | 4 | 11b, 11c, 12b | 2 | TH4 |
| 2 | 5 | 11b, 11c, 12b | 2 | TH5 |
| 2 | 6 | 11b, 11c, 12b | 2 | TH6 |
| 2 | 7 | 11b, 11c, 12b | 3 | TH7 |
| ⋮ | ⋮ | ⋮ | ⋮ | ⋮ |

| PRIORITY | TOTAL PACKET ACCUMULATED AMOUNT |
|---|---|
| 0 | 100 |
| 1 | 200 |
| 2 | 300 |
| 3 | 50 |
| 4 | 30 |
| 5 | 500 |
| 6 | 200 |
| 7 | 140 |

| SPECIFIED THRESHOLD | THRESHOLD |
|---|---|
| TH0 | 300 |
| TH1 | 300 |
| TH2 | 600 |
| TH3 | 600 |
| TH4 | 1200 |
| TH5 | 1200 |
| TH6 | 2000 |
| TH7 | 3000 |

| VLAN NUMBER | PRIORITY | QID | SPECIFIED THRESHOLD |
|---|---|---|---|
| 1 | 0 | 0 | TH0 |
|   | 1 | 0 | TH0 |
|   | 2 | 0 | TH1 |
|   | 3 | 0 | TH1 |
|   | 4 | 0 | TH2 |
|   | 5 | 0 | TH2 |
|   | 6 | 0 | TH3 |
|   | 7 | 0 | TH3 |
| 2 | 0 | 1 | TH2 |
|   | 1 | 1 | TH2 |
|   | 2 | 1 | TH2 |
|   | 3 | 1 | TH4 |
|   | 4 | 2 | TH4 |
|   | 5 | 2 | TH5 |
|   | 6 | 2 | TH6 |
|   | 7 | 3 | TH7 |
| ⋮ | ⋮ | ⋮ | ⋮ |

| VLAN NUMBER | MEMBER PORT NUMBER |
|---|---|
| 1 | 11a, 12a, 12b |
| 2 | 11b, 11c, 12b |
| 3 | 11c, 12c |
| 4 | 11a, 12a, 12b |
| 5 | 11a, 12a |
| ⋮ | ⋮ |

FIG.14

| VLAN NUMBER | PRIORITY | MEMBER PORT NUMBER | QID |
|---|---|---|---|
| 1 | 0 | 11a, 12a, 12b | 0 |
| | 1 | | 0 |
| | 2 | | 0 |
| | 3 | | 0 |
| | 4 | | 0 |
| | 5 | | 0 |
| | 6 | | 0 |
| | 7 | | 0 |
| 2 | 0 | 11b, 11c, 12b | 1 |
| | 1 | | 1 |
| | 2 | | 1 |
| | 3 | | 1 |
| | 4 | | 2 |
| | 5 | | 2 |
| | 6 | | 2 |
| | 7 | | 3 |
| ⋮ | ⋮ | ⋮ | ⋮ |

| PRIORITY | PACKET ACCUMULATED AMOUNT | | | |
|---|---|---|---|---|
| | QID0 | QID1 | QID2 | QID3 |
| 0 | 50 | 100 | 50 | 50 |
| 1 | 310 | 100 | 70 | 70 |
| 2 | 100 | 100 | 90 | 90 |
| 3 | 100 | 100 | 120 | 120 |
| 4 | 150 | 200 | 150 | 150 |
| 5 | 150 | 200 | 180 | 180 |
| 6 | 200 | 300 | 200 | 200 |
| 7 | 300 | 500 | 250 | 250 |

| PRIORITY | THRESHOLD | | | |
|---|---|---|---|---|
| | QID0 | QID1 | QID2 | QID3 |
| 0 | 300 | 200 | 500 | 1000 |
| 1 | 300 | 250 | 600 | 2000 |
| 2 | 600 | 400 | 700 | 3000 |
| 3 | 600 | 500 | 800 | 4000 |
| 4 | 1200 | 700 | 1500 | 5000 |
| 5 | 1200 | 900 | 2500 | 6000 |
| 6 | 2000 | 2500 | 4000 | 8000 |
| 7 | 3000 | 3000 | 8000 | 9000 |

RELAYING APPARATUS AND PACKET RELAYING APPARATUS

CROSS-REFERENCE TO RELATED APPLICATION

This application is based upon and claims the benefit of priority of the prior Japanese Patent Application No. 2008-107177, filed on Apr. 16, 2008, the entire contents of which are incorporated herein by reference.

FIELD

The embodiments discussed herein are directed to a relaying apparatus and packet relaying method of relaying a packet received from an apparatus belonging to a predetermined virtual network to another apparatus.

BACKGROUND

In recent years, some relaying apparatuses, such as switches and routers, which relay a packet, come to have a function called Quality of Service (QoS) for ensuring communication quality. Examples of the function for ensuring communication quality include bandwidth control for achieving data transmission with a lowest bandwidth under contract with each user, priority control for relaying packets in descending order of priority set in each packet, and congestion control for controlling a transfer rate according to the load state on a network.

Specifically, the congestion control is achieved, for example, by: determining whether the amount of received packets is equal to or greater than a predetermined threshold or not according to the priority set for each packet; and, after the amount of received packets reaches the predetermined threshold (when the congestion occurs), discarding the packet received thereafter (refer to Japanese Patent Application Laid-open No. 2004-166080 and Japanese Patent Application Laid-open No. 11-112544).

Meanwhile, Virtual Local Area Networks (VLANs) have become widely used in recent years. The VLAN is a virtual network created in a physical network. Communication providers and users of VLANs desire to realize congestion control for each virtual network.

However, in the conventional technology, although congestion control can be performed for each priority, congestion control cannot be performed for each virtual network. Specifically, in a conventional relaying apparatus, when the amount of received packets of a predetermined priority exceeds a threshold, packets of the predetermined priority are discarded thereafter regardless of a virtual network to which an apparatus that transmits the packet belongs. Thus, congestion control by the conventional relaying apparatus does not take difference in virtual networks into consideration.

SUMMARY

It is an object of the present invention to at least partially solve the problems in the conventional technology.

According to an aspect of an embodiment, a relaying apparatus receives a packet from an apparatus belonging to a predetermined virtual network and relays the packet to another apparatus. The relaying apparatus includes a plurality of queues each provided in association with a combination of a priority indicative of an order of precedence for packet relaying and a VLAN number for identifying a virtual network, a queue-number storage unit that stores a queue number for identifying each of the queues in association with the combination of the priority and the VLAN number, an accumulated-amount storage unit that stores, in association with each priority, a total packet accumulated amount indicative of a sum of packets accumulated in the queues associated with the priority, a threshold storage unit that stores a threshold of the total packet accumulated amount in association with each queue number, a storage-destination-queue determining unit that determines, when a packet is received, that the packet is to be stored in a queue indicated by a queue number stored in the queue-number storage unit in association with a combination of the VLAN number and the priority set for the packet, and a congestion controlling unit that discards the packet based on a total packet accumulated amount stored in the accumulated-amount storage unit in association with a priority set for the packet and a threshold stored in the threshold storage unit in association with a queue number indicative of the queue determined by the storage-destination-queue determining unit, which is a storage-destination queue.

According to another aspect of an embodiment, a relaying apparatus receives a packet from an apparatus belonging to a predetermined virtual network and relays the packet to another apparatus. The relaying apparatus includes a plurality of queues each provided in association with a combination of a priority indicative of an order of precedence for packet relaying and a VLAN number for identifying a virtual network, a queue-number storage unit that stores a queue number for identifying each of the queues in association with the combination of the priority and the VLAN number, an accumulated-amount storage unit that stores, in association with each queue number, a total packet accumulated amount accumulated in a queue indicated by the queue number, a threshold storage unit that stores a threshold of the total packet accumulated amount in association with each queue number, a storage-destination-queue determining unit that determines, when a packet is received, that the packet is to be stored in a queue indicated by a queue number stored in the queue-number storage unit in association with a combination of the VLAN number and the priority set for the packet, and a congestion controlling unit that discards the packet based on a total packet accumulated amount stored in the accumulated-amount storage unit in association with a queue number indicative of the queue determined by the storage-destination-queue determining unit, which is a storage-destination queue, and the threshold stored in the threshold storage unit in association with a queue number indicative of the storage-destination queue.

According to still another aspect of an embodiment, a relaying method is for relaying a packet received from an apparatus belonging to a predetermined virtual network to another apparatus. The relaying method includes storing in a queue-number storage unit, a queue number for identifying each of queues each provided in association with a combination of a priority indicative of an order of precedence for packet relaying and a VLAN number for identifying a virtual network, in association with the combination of the priority and the VLAN number, storing in an accumulated-amount storage unit, in association with each priority, a total packet accumulated amount indicative of a sum of packets accumulated in the queues associated with the priority, storing in a threshold storage unit, a threshold of the total packet accumulated amount in association with each queue number, determining, when a packet is received, that the packet is to be stored in a queue indicated by a queue number stored in the queue-number storage unit in association with a combination of the VLAN number and the priority set for the packet, and discarding the packet based on a total packet accumulated amount stored in the accumulated-amount storage unit in association with a priority set for the packet and a threshold stored in the threshold storage unit in association with a queue number indicative of the queue determined in the determining, which is a storage-destination queue.

According to still another aspect of the present invention, a relaying method is for relaying a packet received from an apparatus belonging to a predetermined virtual network to another apparatus. The relaying method includes storing in a queue-number storage unit, a queue number for identifying each of queues each provided in association with a combination of a priority indicative of an order of precedence for packet relaying and a VLAN number for identifying a virtual network, in association with the combination of the priority and the VLAN number, storing in an accumulated-amount storage unit, in association with each queue number, a total packet accumulated amount accumulated in a queue indicated by the queue number, storing in a threshold storage unit, a threshold of the total packet accumulated amount in association with each queue number, determining, when a packet is received, that the packet is to be stored in a queue indicated by a queue number stored in the queue-number storage unit in association with a combination of the VLAN number and the priority set for the packet, and discarding the packet based on a total packet accumulated amount stored in the accumulated-amount storage unit in association with a queue number indicative of the queue determined in the determining, which is a storage-destination queue, and the threshold stored in the threshold storage unit in association with a queue number indicative of the storage-destination queue.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 4 is a drawing of an example of a route storage unit;

FIG. 5 is a drawing of an example of a queue-number storage unit;

FIG. 7 is a drawing of an example of an accumulated-amount storage unit;

FIG. 8 is a drawing of an example of a threshold storage unit;

FIG. 11 is a drawing of an example of a queue-number storage unit;

FIG. 12 is a drawing of an example of a VLAN storage unit;

FIG. 14 is a drawing of an example of a queue-number storage unit;

FIG. 16 is a drawing of an example of an accumulated-amount storage unit; and

FIG. 17 is a drawing of an example of a threshold storage unit.

DESCRIPTION OF EMBODIMENTS

Embodiments of a relaying apparatus and packet relaying method according to the present invention are explained in detail below based on the drawings. In examples described below as the embodiments, the relaying apparatus and the packet relaying method are applied to a switch. Alternatively, the relaying apparatus and the packet relaying method can be applied to other relaying apparatuses, such as a router.

[a] First Embodiment

Figure 1:
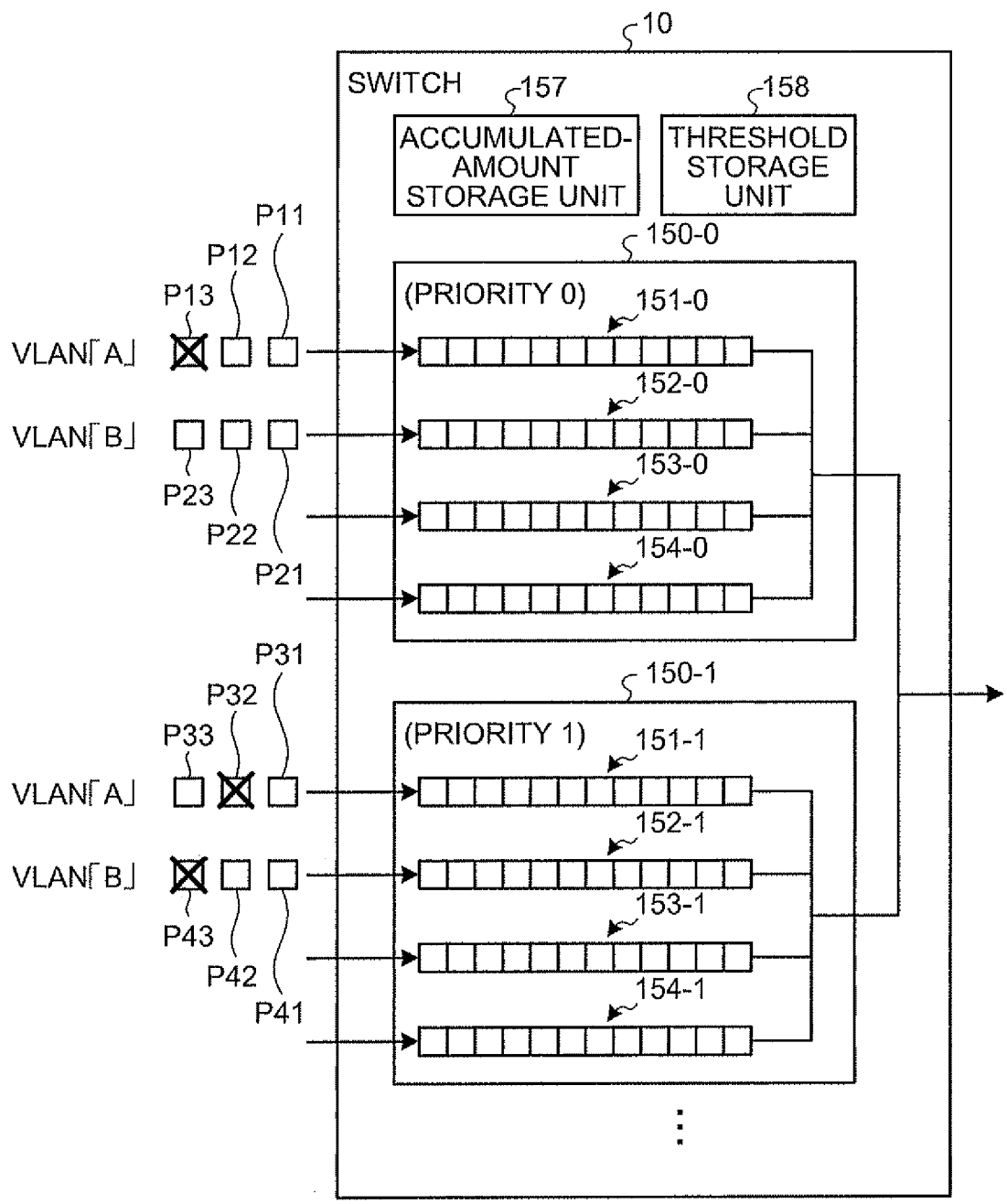
FIG. 1 is a drawing for explaining a general outline of a switch according to a first embodiment.

Firstly, a switch according to a first embodiment is schematically explained. FIG. 1 depicts an overview of the switch according to the first embodiment. As depicted in FIG. 1, a switch 10 according to the first embodiment includes an accumulated-amount storage unit 157, a threshold storage unit 158, a queue group 150-0, and others.

The accumulated-amount storage unit 157 stores a total size of packets accumulated in all queues of the queue group 150-0, i.e., queues 151-0, 152-0, and so on, in association with a priority corresponding to the queue group 150-0. For example, the accumulated-amount storage unit 157 stores the total size of packets (hereinafter, also referred to as "total packet accumulated amount") accumulated in queues 151-0 to 154-0 in association with a priority "0", and stores the total size of packets accumulated in queues 151-1 to 154-1 in association with a priority "1". The threshold storage unit 158 stores, for each of the queues 151-0 and others, a threshold of the total packet accumulated amount.

The switch 10 has a queue group like the queue group 150-0 corresponding to each priority of the packet. Assuming that the priority range set for received packets is from "0" to "7", eight queue groups 150-0 to 150-7 are arranged in the switch 10 of FIG. 1. In FIG. 1, the queue group 150-0 corresponds to the priority "0", whereas the queue group 150-1 corresponds to the priority "1".

Each of the queue groups 150-0 to 150-7 has a plurality of queues. In the example of FIG. 1, the queue group 150-0 has four queues 151-0 to 154-0, whereas the queue group 150-1 has four queues 151-1 to 154-1.

On receiving a packet, the switch 10 according to the first embodiment causes the packet to be stored in a predetermined storage unit (i.e., a stream memory 16, which will be explained later). The switch 10 stores an instruction for relaying a packet stored in the stream memory 16 to another apparatus (hereinafter, "relay instruction") in the queue 151-0, for example. For simplicity of description of FIG. 1, the received packet is assumed to be stored in the queue such as the queue 151-0 in FIG. 1.

On receiving a packet, the switch 10 of the above-described configuration determines a queue in which the received packet is to be stored based on a VLAN number, a priority set for the packet, and various information stored in a predetermined storage unit (i.e., a queue-number storage unit 173, which will be explained later). The queue determined by the switch 10 as a storage destination of the packet is hereinafter referred to as a "storage-destination queue".

The switch 10 then obtains from the accumulated-amount storage unit 157 a total packet accumulated amount stored in association with a priority set for the received packet. Further, the switch 10 obtains from the threshold storage unit 158 a threshold stored in association with the storage-destination queue of the received packet. The switch 10 then compares the obtained total packet accumulated amount and threshold with each other. When the total packet accumulated amount is smaller than the threshold, the switch 10 stores the received packet in the storage-destination queue, and adds the size of the stored packet to the total packet accumulated amount stored in the accumulated-amount storage unit 157 in association with the priority set for the packet. On the other hand, when the total packet accumulated amount is equal to or greater than the threshold, the switch 10 discards the received packet.

The above-described process by the switch 10 is explained by using the example depicted in FIG. 1. In FIG. 1, packets P11 to P13 have their VLAN number set as "A" and their priority set as "0". Further, packets P21 to P23 have their VLAN number set as "B" and their priority set as "0". Furthermore, the threshold for the queue 151-0 stored in the threshold storage unit 158 is "100" and the threshold for the queue 152-0 is "200". Still further, each total packet accumulated amount in the accumulated-amount storage unit 157 before reception of the packet P11, for example, has a value smaller than the threshold stored in the threshold storage unit 158. Still further, the switch 10 receives the packets P11, P12, P13, P21, P22, and then P23 in this order.

Upon receiving the packet P11, the switch 10 stores the packet P11 in the queue 151-0 in the queue group 150-0 corresponding to the priority "0", and adds the size of the packet P11 to the total packet accumulated amount for the priority "0" stored in the accumulated-amount storage unit 157. Then, upon receiving the packet P12, the switch 10 stores the packet P12 in the queue 151-0, and adds the size of the packet P12 to the total packet accumulated amount for the priority "0" stored in the accumulated-amount storage unit 157.

At this time, it is assumed that the total packet accumulated amount for the priority "0" stored in the accumulated-amount storage unit 157 becomes "110", exceeding the threshold "100" for the queue 151-0 stored in the threshold storage unit 158. Then, upon receiving the packet P13 thereafter, the switch 10 discards the packet P13.

Subsequently, when the switch 10 receives the packet P21, the total packet accumulated amount "110" for the priority "0" is not equal to or greater than the threshold "200" for the queue 152-0, and therefore the switch 10 stores the packet P21 in the queue 152-0 and updates the accumulated-amount storage unit 157. Similarly, when the switch 10 receives the packets P22 and P23, as long as the total packet accumulated amount "110" for the priority "0" is not equal to or greater than the threshold "200" for the queue 152-0, the switch 10 stores the packets P22 and P23 in the queue 152-0 and updates the accumulated-amount storage unit 157.

Further, in the example of FIG. 1, packets P31 to P33 have their VLAN number set as "A" and their priority set as "1". Packets P41 to P43 have their VLAN number set as "B" and their priority set as "1". Furthermore, the threshold for the queue 151-1 stored in the threshold storage unit 158 is "200" and the threshold for the queue 152-1 is "300". Still further, the switch 10 receives the packets P31, P32, P33, P41, P42, and then P43 in this order.

Upon receiving the packet P31, the switch 10 stores the packet P31 in the queue 151-1, and adds the size of the packet P31 to the total packet accumulated amount for the priority "1" stored in the accumulated-amount storage unit 157. At this time, it is assumed that the total packet accumulated amount for the priority "1" stored in the accumulated-amount storage unit 157 becomes "210", exceeding the threshold "200" for the queue 151-1 stored in the threshold storage unit 158. Then, upon receiving the packet P32 thereafter, the switch 10 discards the packet P32.

Here, assume that the total packet accumulated amount for the priority "1" stored in the accumulated-amount storage unit becomes "190" because the switch 10 transmits a packet accumulated in the queue 151-1 to another apparatus before receiving the packet P33. This means that the total packet accumulated amount for the priority "1" becomes smaller than the threshold "200" for the queue 151-1. In this case, when the switch 10 receives the packet P33 thereafter, the total packet accumulated amount "190" for the priority "1" is not equal to or greater than the threshold "200" for the queue 151-1, and therefore the switch 10 stores the packet P33 in the queue 151-1 and updates the accumulated-amount storage unit 157.

Subsequently, the switch 10 receives the packets P41 and P42, stores these packets P41 and P42 in the queue 152-1, and updates the accumulated-amount storage unit 157. At this time, it is assumed that the total packet accumulated amount for the priority "1" stored in the accumulated-amount storage unit 157 becomes "310" exceeding the threshold "300" for the queue 152-1 stored in the threshold storage unit 158. Then, upon receiving the packet P43 thereafter, the switch 10 discards the packet P43.

The switch 10 according to the first embodiment includes a plurality of queues each provided in association with a combination of priority and VLAN number, the accumulated-amount storage unit 157 that stores a total size of packets accumulated in queues associated with the same priority, and the threshold storage unit 158 that stores a threshold of the packet accumulated amount for each queue. When receiving a packet, the switch 10 determines whether to discard the packet based on the total packet accumulated amount stored in the accumulated-amount storage unit 157 in association with the priority set for the packet and the threshold stored in the threshold storage unit 158 in association with the storage-destination queue for the packet. Thus, congestion control can be performed for each virtual network.

In the above-described example, packets with different VLAN numbers are stored in different queues. Alternatively, packets with different VLAN numbers may be stored in the same queue. For example, the switch 10 may store packets having VLAN numbers "A" to "C" in the queue 151-0 and packets having VLAN numbers "D" to "F" in the queue 151-1.

Then, several virtual networks can be handled as one virtual network group, and congestion control can be performed for each virtual network group. For example, when a plurality of virtual networks is employed for the same type of works, these virtual networks can be considered as one virtual network group for the purpose of congestion control. In addition, even when the network includes plural VLANs, the switch does not need to have queues as many as the number of VLANs, whereby the configuration of the switch 10 can be simplified.

Further, by putting plural virtual networks which distribute the packets at different time zones but have the same threshold of the packet accumulated amount into the same virtual network group, resources (queues) can be effectively used. Specifically, when a virtual network A and a virtual network B have the same threshold of the packet accumulated amount, and packets are distributed only in the morning in the virtual network A and packets are distributed only in the afternoon in the virtual network B, the virtual networks A and B can be put into one virtual network group. Then, a predetermined queue can be used in the morning for relaying a packet over the virtual network A and can be used in the afternoon for relaying a packet over the virtual network B. As a result, the period during which the queues are not used can be reduced. Thus, the resources (queues) can be effectively used. Packets with different VLAN numbers can be stored in the same queue by changing various information stored in the queue-number storage unit 173 which will be explained later.

Figure 2:
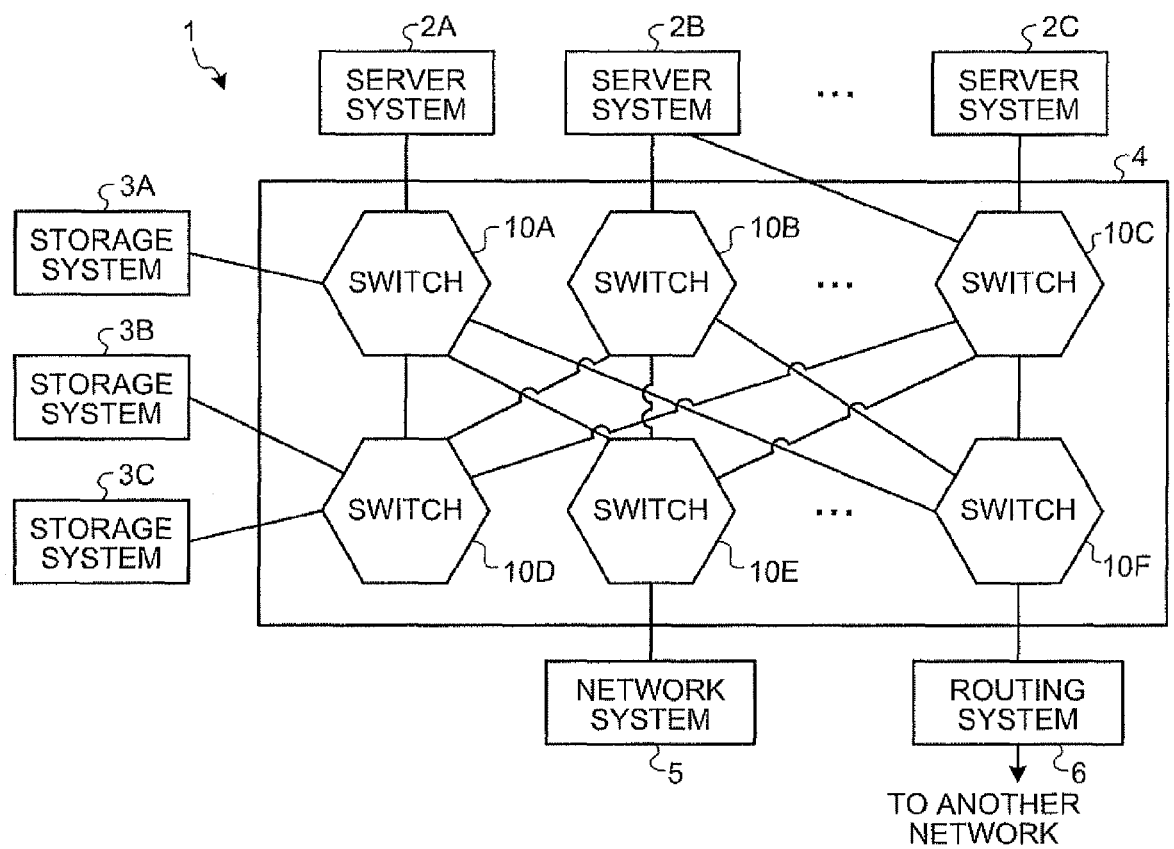
FIG. 2 is a drawing of an example of configuration of a network to which the switch according to the first embodiment is applied.

Next, a network to which the switch 10 according to the first embodiment is applied is explained. FIG. 2 is a drawing of an example of configuration of a network to which the switch 10 according to the first embodiment is applied. As depicted in FIG. 2, a network 1 includes server systems 2A to 2C, storage systems 3A to 3C, a switch group 4 including switches 10A to 10F, a network system 5, and a routing system 6. It is assumed that a plurality of virtual networks (VLANs) is formed in the network 1.

The server systems 2A to 2C are information processing apparatuses, such as host computers, and are connected to any one or more of the switches 10A to 10F. The storage systems 3A to 3C are data input and output apparatuses, such as storage apparatuses, and are connected to any of the switches 10A to 10F. The network system 5 is an apparatus for maintenance and monitoring of the network 1, and is connected to the switch 10E. The routing system 6 is an apparatus for relaying data between the network 1 and other network, and is connected to the switch 10F.

The switches 10A to 10F are relaying apparatuses for data relaying process, and are each connected to any one or more of the switches 10A to 10F other than itself and to any one or more of the server systems 2A to 2C, for example. In the network 1 in which virtual networks are formed, the switches 10A to 10F perform a relaying process by inserting or deleting a VLAN tag in or from a packet.

Note that the configuration of the network 1 depicted in FIG. 2 is merely an example, and the configuration example of the network to which the switches 10A to 10F according to the first embodiment are applied is not restricted to the one depicted in FIG. 2. For example, in the network 1 of FIG. 2, three server systems 2A to 2C, three storage systems 3A to 3C, six switches 10A to 10F, one network system 5, and one routing system 6 are provided. However, each number of components is not restricted to this example.

Figure 3:
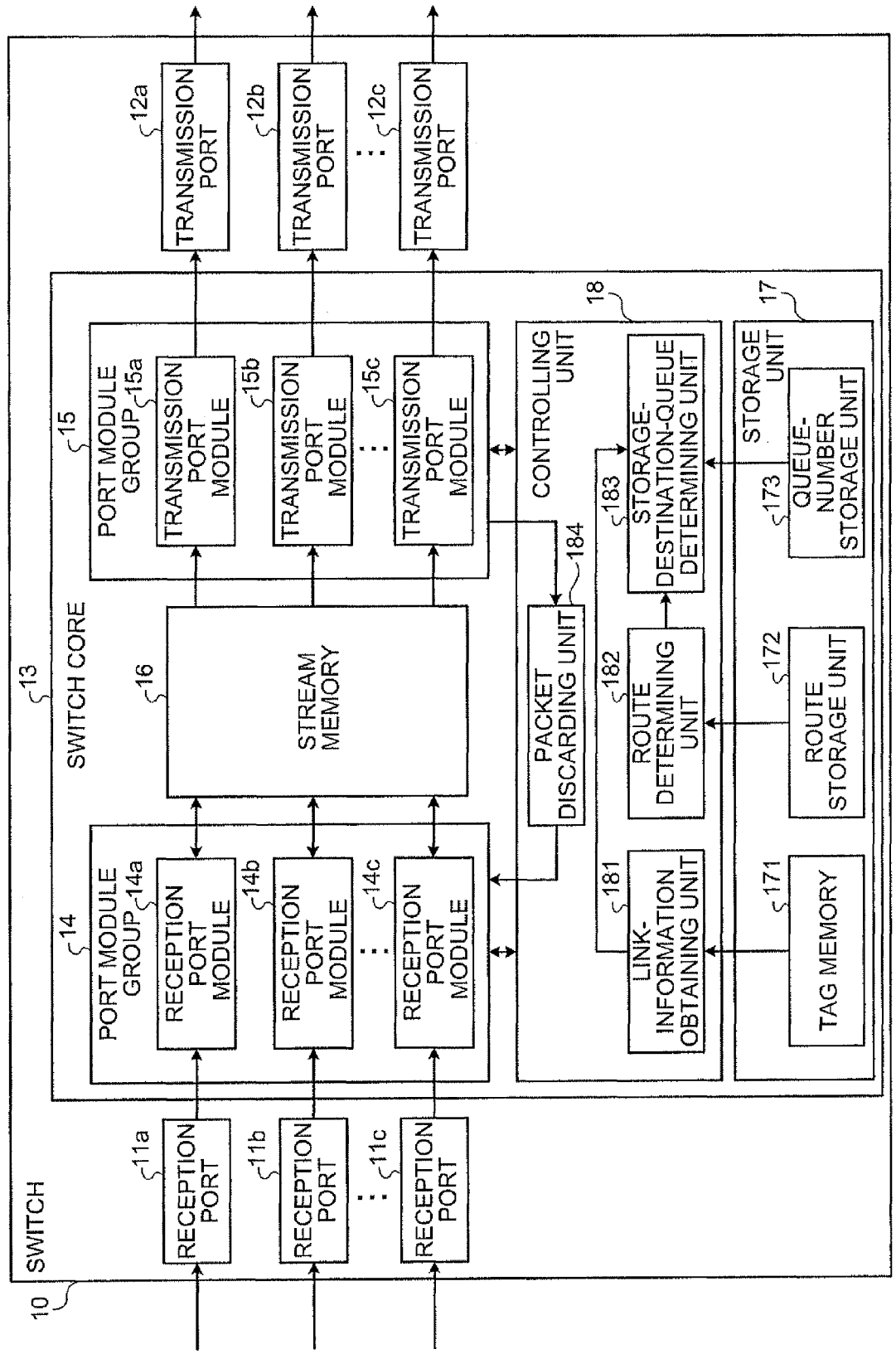
FIG. 3 is a block diagram of configuration of the switch according to the first embodiment.

Next, the configuration of the switch 10 according to the first embodiment is explained. FIG. 3 is a block diagram of the configuration of the switch 10 according to the first embodiment. Note that the switch 10 depicted in FIG. 3 corresponds to each of the switches 10A to 10F depicted in FIG. 2. As depicted in FIG. 3, the switch 10 includes reception ports 11a to 11c, transmission ports 12a to 12c, and a switch core 13.

The reception ports 11a to 11c are interfaces that receive a packet from a predetermined apparatus (for example, any of the server systems 2A to 2C or another switch). Each of the reception ports 11a to 11c receives a packet from an apparatus belonging to a predetermined virtual network. For example, the reception port 11a receives a packet only from an apparatus belonging to any of virtual networks A to E, whereas the reception port 11b receives a packet only from an apparatus belonging to any of virtual networks F to J.

The transmission ports 12a to 12c are interfaces that transmit the packet received by the reception ports 11a to 11c to another apparatus. Each of the transmission ports 12a to 12c transmits a packet to an apparatus belonging to a predetermined virtual network. For example, the transmission port 12a transmits a packet only to an apparatus belonging to any of the virtual networks A to E, whereas the transmission port 12b transmits a packet only to an apparatus belonging to any of the virtual networks F to J.

In the example depicted in FIG. 3, the switch 10 includes three reception ports 11a to 11c and three transmission ports 12a to 12c. Alternatively, the switch 10 may include two or less reception ports and transmission ports, or four or more reception ports and transmission ports.

The switch core 13 is a functional unit for relaying data, and includes a port module group 14 including reception port modules 14a to 14c, a port module group 15 including transmission port modules 15a to 15c, the stream memory 16, a storage unit 17, and a controlling unit 18.

The reception port modules 14a to 14c are provided for the reception ports 11a to 11c, respectively, and, when a packet is input from the corresponding one of the reception ports 11a to 11c, write the packet in the stream memory 16 and output header information of the packet to the controlling unit 18. The "header information" herein represents, for example, Destination Address (DA: Destination Media Access Control (MAC) address) and Source Address (SA: transmission-source MAC address), VLAN number, and priority.

In the example of FIG. 3, the reception port module 14a corresponds to the reception port 11a, the reception port module 14b corresponds to the reception port 11b, and the reception port module 14c corresponds to the reception port 11c. Therefore, the reception port module 14a performs the process explained above on the packet received by the reception port 11a.

The transmission port modules 15a to 15c are provided for the transmission ports 12a to 12c, respectively, and output a packet stored in the stream memory 16 for output to the transmission ports 12a to 12c. Specifically, the transmission port modules 15a to 15c each have a plurality of queues for storing a relay instruction and, according to such a relay instruction, transmit a packet stored in the stream memory 16 to another apparatus via the transmission ports 12a to 12c. The configuration of the transmission port modules 15a to 15c will be explained in detail further below.

In the example of FIG. 3, the transmission port module 15a corresponds to the transmission port 12a, the transmission port module 15b corresponds to the transmission port 12b, and the transmission port module 15c corresponds to the transmission port 12c. Therefore, the transmission port module 15a outputs a packet to the transmission port 12a.

The stream memory 16 is a storage device, such as a memory, storing a packet written by any of the reception port modules 14a to 14c. The stream memory 16 has a storage area divided into logical blocks of a predetermined size to store data in units of logical block. For example, when the packet size is equal to or smaller than the size of one logical block, the stream memory 16 stores such a packet in one logical block. On the other hand, when the packet size is greater than the size of one logical block, the stream memory 16 stores such a packet as being divided into a plurality of logical blocks.

The storage unit 17 is a storage device, such as a memory, and includes a tag memory 171, a route storage unit 172, and the queue-number storage unit 173. The tag memory 171 stores various information for managing the logical blocks of the stream memory 16.

Specifically, the tag memory 171 stores logical block numbers for identifying the logical blocks. Also, the tag memory 171 stores information indicative of a relationship among the logical blocks (hereinafter, "link information"). Here, examples of the link information stored in the tag memory 171 are explained. For example, assume that one packet P101 is stored as being divided into three logical blocks R1 to R3. In this case, the tag memory 171 stores link information indicating that the packet P101 is stored in the logical blocks R1 to R3. Also, for example, assume that one data is divided into nine packets P201 to P209 and these packets P201 to P209 are stored in a plurality of logical blocks R11 to R30. In this case, the tag memory 171 stores link information indicating that the packets P201 to P209 are stored in the logical blocks R11 to R30.

The route storage unit 172 stores, in association with the DA set for the packet, a number for identifying an output-destination transmission port for the packet (hereinafter, numbers for identifying the reception ports 11a to 11c and the transmission ports 12a to 12c are referred to as "port numbers"). An example of the route storage unit 172 is depicted in FIG. 4. As depicted in FIG. 4, the route storage unit 172 has items, such as MAC address and port number. The MAC address indicates a DA set for the packet. The port number indicates a port number of the corresponding output destination of the transmission ports 12a to 12c for the packet with its DA set with the corresponding MAC address. In the following, the reference numerals "11a" to "11c" provided to the reception ports 11a to 11c and "12a" to "12c" provided to the transmission ports 12a to 12c depicted in FIG. 3 are taken as port numbers.

The first row of the route storage unit 172 depicted in FIG. 4 indicates that a packet with its DA set with "00:01:02:03:04:05" is output to the transmission port 12a indicated by the port number "12a". The second row of the route storage unit 172 depicted in FIG. 4 indicates that a packet with its DA set with "00:01:02:03:04:06" is output to the transmission port 12b indicated by the port number "12b".

The queue-number storage unit 173 stores, for each priority in association with a VLAN number, a queue number (hereinafter, "Queue ID (QID)") for identifying a queue in which a relay instruction is to be stored. An example of the queue-number storage unit 173 is depicted in FIG. 5. As depicted in FIG. 5, the queue-number storage unit 173 has items, such as VLAN number, priority, member port number, QID, and specified threshold.

The VLAN number indicates a number for identifying a virtual network. The member port number indicates a port number of any of the reception ports 11a to 11c that receives a packet distributed over the virtual network indicated by the VLAN number and any of the transmission ports 12a to 12c that transmits a packet over the virtual network indicated by the VLAN number. QID indicates a QID of the storage-destination queue of a relay instruction generated based on the packet set with the corresponding VLAN number and priority. The specified threshold indicates a threshold of the packet size that can be received by the switch 10. A specific threshold is stored in the threshold storage unit 158, which will be explained further below.

That is, the first to eighth rows of the queue-number storage unit 173 depicted in FIG. 5 indicates that the reception port 11a is a port that receives a packet distributed over the virtual network indicated by a VLAN number "1" and that the transmission port 12a or 12b is a port that transmits the distributed packet. Further, the first row of the queue-number storage unit 173 depicted in FIG. 5 indicates that a relay instruction with the VLAN number "1" and the priority "0" is stored in a queue indicated by a QID "0".

The controlling unit 18 is a controlling unit for controlling the entire switch core 13, and includes a link-information obtaining unit 181, a route determining unit 182, a storage-destination-queue determining unit 183, and a packet discarding unit 184. The link-information obtaining unit 181 is a processing unit that, when header information is input from the port module group 14, obtains from the tag memory 171 link information of a packet having this header information, and then outputs the obtained link information to the storage-destination-queue determining unit 183.

The route determining unit 182 is a processing unit that determines a transmission port to which the received packet is to be transmitted, based on various information stored in the route storage unit 172. Specifically, when header information is input from the port module group 14, the route determining unit 182 obtains from the route storage unit 172 a port number stored in association with the DA set for the header information. Then, the route determining unit 182 determines that the packet having this header information is to be output to any one of the transmission ports 12a to 12c that is indicated by the obtained port number.

For example, when the route storage unit 172 is in a state depicted in FIG. 4 and header information Hi having the DA set with "00:01:02:03:04:05" is input to the route determining unit 182 from the port module group 14, the route determining unit 182 obtains the port number "12a" from the route storage unit 172. The route determining unit 182 then determines that the packet having the header information H1 is to be output to the transmission port 12a indicated by the obtained port number "12a".

The storage-destination-queue determining unit 183 is a processing unit that generates a relay instruction based on various information stored in the queue-number storage unit 173 and determines a storage-destination queue for the generated relay instruction.

Specifically, when header information is input from the port module group 14, the storage-destination-queue determining unit 183 obtains from the queue-number storage unit 173 a QID and a specified threshold stored in association with a combination of the VLAN number and the priority set for this header information. The queue indicated by the obtained QID is the storage-destination queue for the packet having this header information.

Subsequently, the storage-destination-queue determining unit 183 generates a relay instruction including, for example, the input header information, a logical block number(s) indicating a logical block(s) on the stream memory 16 where the packet having this header information is stored, the QID and the specified threshold obtained from the queue-number storage unit 173, and the link information input from the link-information obtaining unit 181. Here, the storage-destination-queue determining unit 183 may include the packet size in the relay instruction. Subsequently, the storage-destination-queue determining unit 183 outputs the generated relay instruction to any of the transmission port modules 15a to 15c corresponding to any of the transmission ports 12a to 12c determined by the route determining unit 182.

For example, when the route storage unit 172 is in a state depicted in FIG. 4 and the queue-number storage unit 173 is in a state depicted in FIG. 5, and header information H2 set with a DA "00:01:02:03:04:06", a VLAN number "2", and a priority "7" is input to the controlling unit 18 from the port module group 14, the route determining unit 182 determines that the packet having the header information H2 is to be transmitted to the transmission port 12b. Subsequently, the storage-destination-queue determining unit 183 obtains a QID "3" and a specified threshold "TH7" stored in the queue-number storage unit 173 in association with a combination of the VLAN number "2" and the priority "7". Subsequently, the storage-destination-queue determining unit 183 generates a relay instruction including the QID "3" and the specified threshold "TH7". Subsequently, the storage-destination-queue determining unit 183 outputs the generated relay instruction to the transmission port module 15b corresponding to the transmission port 12b determined by the route determining unit 182.

The packet discarding unit 184 is a processing unit that, when information indicating that the relay instruction has been discarded (hereinafter, "discard information") is input from a congestion controlling unit 159, which will be explained further below, discards from the stream memory 16 a packet stored in the logical block indicated by the logical block number included in the relay instruction. A discard-information output process by the congestion controlling unit 159 will be explained in detail further below.

An example of a technique of discarding a packet stored in the stream memory 16 is explained. For example, the packet discarding unit 184 causes any of the reception port modules 14a to 14c to read a discard-target packet from the stream memory 16. When the stored information is read from the stream memory 16, the information is deleted. Therefore, the packet is discarded by being read by any of the reception port modules 14a to 14c.

Figure 6:
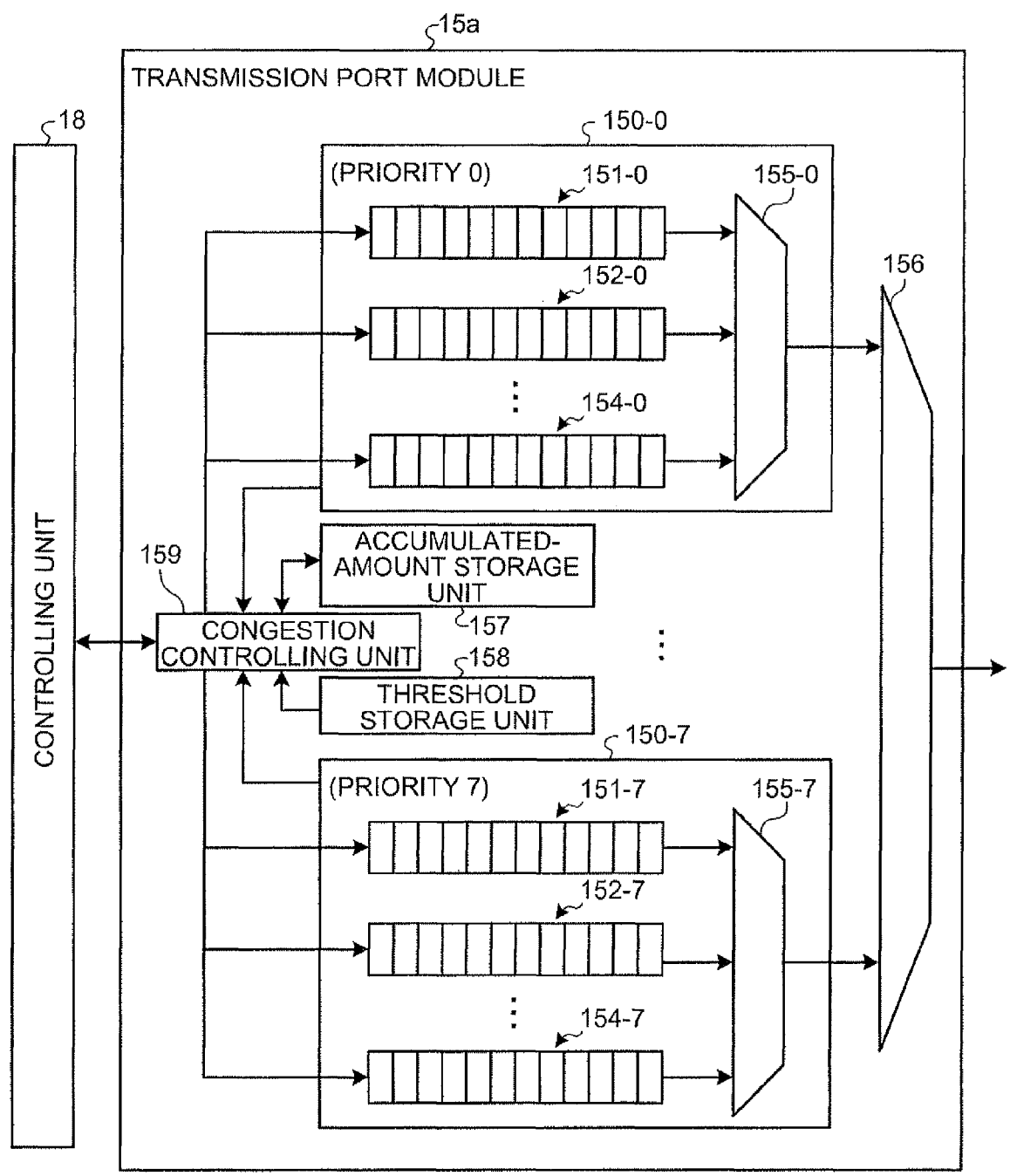
FIG. 6 is a block diagram of configuration of a transmission port module depicted in FIG. 3.

Next, the configuration of the transmission port modules 15a to 15c depicted in FIG. 3 is explained. FIG. 6 is a block diagram of the configuration of one of the transmission port modules 15a to 15c depicted in FIG. 3. Since the transmission port modules 15a to 15c have the same configuration, only the configuration of the transmission port module 15a is explained.

As depicted in FIG. 6, the transmission port module 15a includes the queue groups 150-0 to 150-7, a priority control transmission scheduler 156, the accumulated-amount storage unit 157, the threshold storage unit 158, and the congestion controlling unit 159.

The queue group 150-0 includes the queues 151-0 to 154-0 and a round-robin control scheduler (hereinafter, "DRR scheduler") 155-0. The queues 151-0 to 154-0 are storage areas in which a relay instruction with a priority "0" is stored by the congestion controlling unit 159, which will be explained further below.

The DRR scheduler 155-0 is a processing unit that takes out a relay instruction from any of the queues 151-0 to 154-0 through a DRR technique. The DRR scheduler 155-0 may take out a relay instruction through a round robin technique with the same weighting ratio or a Weighted Round Robin (WRR) technique. Further, the DRR scheduler 155-0 may take out a relay instruction through a round robin technique disclosed in Japanese Patent Application Laid-open No. 2004-242335 applied by the applicant of the present application.

Similarly, the queue group 150-7 includes queues 151-7 to 154-7 in which a relay instruction with a priority "7" is stored by the congestion controlling unit 159 and a DRR scheduler 155-7. Although not depicted in FIG. 6, the transmission port module 15a also includes queue groups 150-1 to 150-6 in which relay instructions with priorities "1" to "6" are stored, respectively. The configuration of these queue groups 150-1 to 150-6 is similar to the configuration of the queue groups 150-0 and 150-7.

In the example depicted in FIG. 6, each of the queue groups 150-0 to 150-7 includes four queues (in the example of the queue group 150-0, the queues 151-0 to 154-0). Alternatively, each of the queue groups 150-0 to 150-7 may include three or less queues or five or more queues.

In the following, it is assumed that QIDs of each queue included in the queue group 150-0, for example, are "0", "1", "2", and "3" from the top. Specifically, it is assumed that the QID of the queue 151-0 is "0", the QID of the queue 152-0 is "1", the QID of the queue 153-0 is "2", and the QID of the queue 154-0 is "3". Similarly, it is assumed that the QID of the queue 151-7 is "0", the QID of the queue 152-7 is "1", the QID of the queue 153-7 is "2", and the QID of the queue 154-7 is "3".

The priority control transmission scheduler 156 processes the relay instructions taken out by the DRR schedulers 155-0 to 155-7 in the descending order of priority according to the respective relay instructions. Specifically, the priority control transmission scheduler 156 reads from the stream memory 16 a packet stored in a logical block indicated by the logical block number included in the relay instruction for output to the transmission port 12a. Further, when link information is included in the relay instruction, the priority control transmission scheduler 156 reads from the stream memory 16 a packet stored in a logical block indicated by the logical block number included in the link information for output to the transmission port 12a. The priority control transmission scheduler 156 performs a similar packet output process according to the relay instruction in the descending order of priority.

In this manner, the DRR schedulers 155-0 to 155-7 take out a relay instruction from each queue through the DRR technique, thereby allowing bandwidth control for each virtual network. Also, the priority control transmission scheduler 156 transmits packets in the descending order of priority to other apparatuses according to the relay instructions, thereby allowing priority control in consideration of each priority of every received packet.

The accumulated-amount storage unit 157 stores a total size of packets indicated by the relay instructions stored in a plurality of queues provided for each priority. An example of the accumulated-amount storage unit 157 is depicted in FIG. 7. As depicted in FIG. 7, the accumulated-amount storage unit 157 includes items, such as priority and total packet accumulated amount. The priority indicates a priority in association with queue. The total packet accumulated amount indicates a total size of packets indicated by the relay instructions stored in the queues provided in association with each corresponding priority.

That is, the first row of the accumulated-amount storage unit 157 depicted in FIG. 7 indicates that the total size of packets indicated by the relay instructions stored in the queues 151-0 to 154-0 provided in association with the priority "0" is "100 bytes". The eighth row of the accumulated-amount storage unit 157 indicates that the total size of packets indicated by the relay instructions stored in the queues 151-7 to 154-7 provided in association with the priority "7" is "140 bytes".

The threshold storage unit 158 stores a specific threshold in association with a specified threshold. An example of the threshold storage unit 158 is depicted in FIG. 8. As depicted in FIG. 8, the threshold storage unit 158 includes items, such as specified threshold and threshold. The specified threshold corresponds to the specified threshold included in the queue-number storage unit 173 depicted in FIG. 5. The threshold indicates a threshold of the total packet accumulated amount.

That is, the first row of the threshold storage unit 158 depicted in FIG. 8 indicates that the threshold of a specified threshold "TH0" is "300 bytes", whereas the eighth row of the threshold storage unit 158 depicted in FIG. 8 indicates that the threshold of a specified threshold "TH7" is "3000 bytes".

The congestion controlling unit 159 is a processing unit that performs control to determine, when a relay instruction is input from the storage-destination-queue determining unit 183, whether to discard the relay instruction or store it in a predetermined queue. Specifically, the congestion controlling unit 159 obtains a total packet accumulated amount stored in the accumulated-amount storage unit 157 in association with the priority included in the relay instruction input from the storage-destination-queue determining unit 183. Subsequently, the congestion controlling unit 159 obtains a threshold stored in the threshold storage unit 158 in association with the specified threshold included in the relay instruction. Then, the congestion controlling unit 159 compares the total packet accumulated amount obtained from the accumulated-amount storage unit 157 and the threshold obtained from the threshold storage unit 158 with each other.

When the total packet accumulated amount is smaller than the threshold, the congestion controlling unit 159 stores the relay instruction in a queue indicated by the QID included in the relay instruction from among the queues provided in association with the priority included in the relay instruction. On the other hand, when the total packet accumulated amount is equal to or greater than the threshold, the congestion controlling unit 159 discards the relay instruction, and outputs discard information to the packet discarding unit 184.

Figure 9:
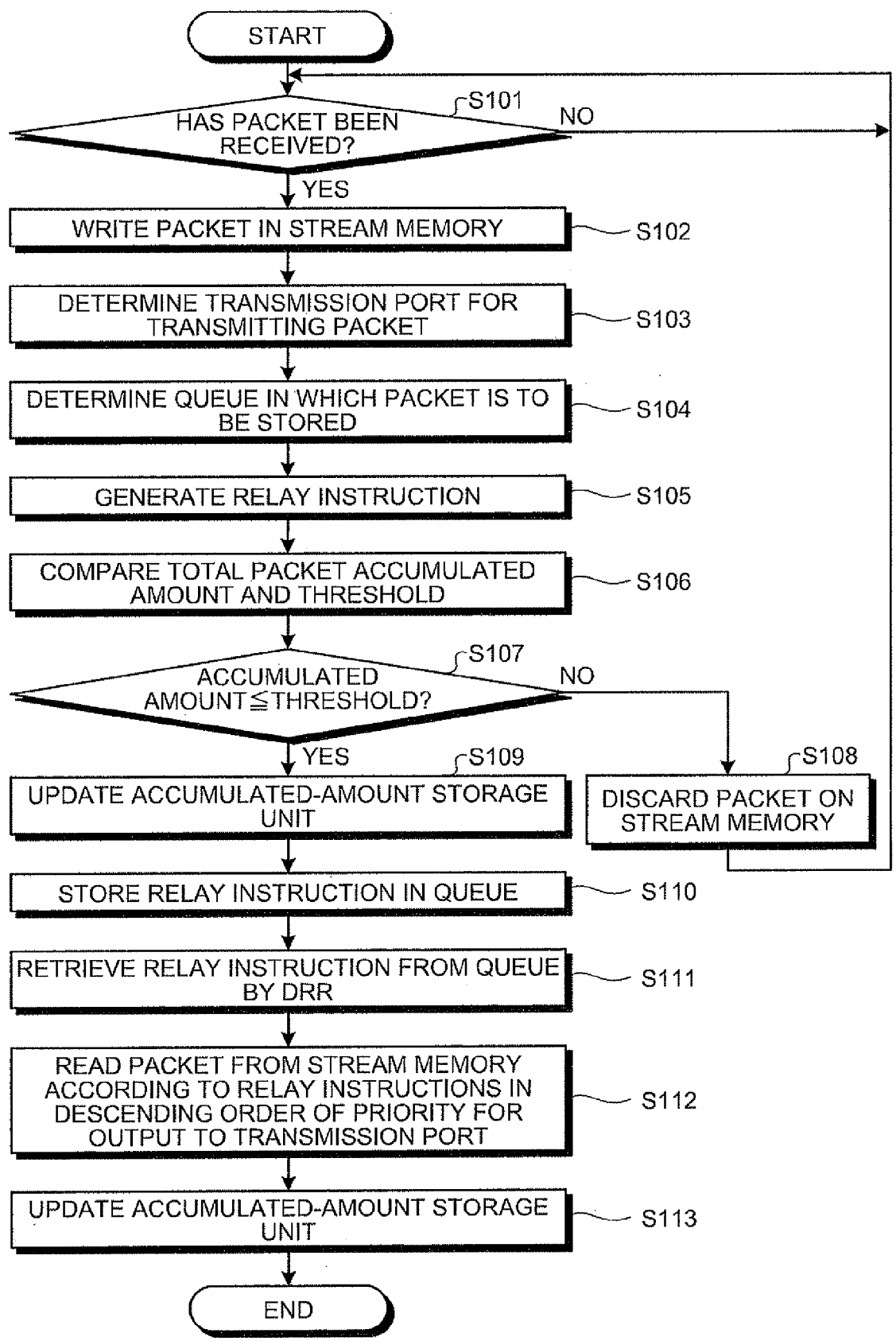
FIG. 9 is a flowchart of a packet relaying procedure performed by the switch according to the first embodiment.

Next, a packet relaying procedure performed by the switch 10 according to the first embodiment is explained. FIG. 9 is a flowchart of the packet relaying procedure performed by the switch 10 according to the first embodiment. As depicted in FIG. 9, when any of the reception ports 11a to 11c of the switch 10 receives a packet (Yes at Step S101), one of the reception ports 11a to 11c outputs header information of the packet to the controlling unit 18, and writes the packet in the stream memory 16 (Step S102).

The route determining unit 182 of the controlling unit 18 accepting the header information determines a transmission port to which the packet is to be transmitted, based on the header information and various information stored in the route storage unit 172 (Step S103)

Subsequently, the storage-destination-queue determining unit 183 obtains a QID and a specified threshold stored in the queue-number storage unit 173 in association with a combination of the VLAN number and the priority set for the input header information. The storage-destination-queue determining unit 183 then determines, from among the plurality of queues provided in association with the priority set for the header information, that a relay instruction is to be stored in a queue indicated by the QID obtained from the queue-number storage unit 173 (Step S104).

Subsequently, the storage-destination-queue determining unit 183 generates a relay instruction including, for example, the input header information, a logical block number indicating a logical block in which the packet having the header information is stored, the QID and the specified threshold obtained from the queue-number storage unit 173, and link information input from the link-information obtaining unit 181 (Step S105). Subsequently, the storage-destination-queue determining unit 183 outputs the generated relay instruction to one of the transmission port modules 15a to 15c that corresponds to any of the transmission ports 12a to 12c determined by the route determining unit 182.

The congestion controlling unit 159 of any of the transmission port modules 15a to 15c that receives the input of the relay instruction from the storage-destination-queue determining unit 183 obtains a total packet accumulated amount stored in the accumulated-amount storage unit 157 in association with the priority included in the input relay instruction, and also obtains a threshold stored in the threshold storage unit 158 in association with the specified threshold included in the relay instruction. Subsequently, the congestion controlling unit 159 compares the total packet accumulated amount obtained from the accumulated-amount storage unit 157 and the threshold obtained from the threshold storage unit 158 with each other (Step S106).

When the total packet accumulated amount is greater than the threshold (No at Step S107), the congestion controlling unit 159 discards the relay instruction, and outputs discard information to the packet discarding unit 184. The packet discarding unit 184 accepting the discard information discards from the stream memory 16 the packet indicated by the logical block number included in the relay instruction (Step S108).

On the other hand, when the total packet accumulated amount is equal to or smaller than the threshold (Yes at Step S107), the congestion controlling unit 159 adds the size of the packet indicated by the relay instruction to the total packet accumulated amount stored in the accumulated-amount storage unit 157 in association with the priority included in the relay instruction (Step S109). Subsequently, among the plurality of queues provided corresponding to the priority included in the relay instruction, the congestion controlling unit 159 stores the relay instruction in a queue indicated by the QID included in the relay instruction (Step S110).

Subsequently, one of the DRR schedulers 155-0 to 155-7 of the transmission port modules 15a to 15c takes out relay instructions from the queues through the DRR technique (Step S111). Specifically, the DRR scheduler 155-0 takes out a relay instruction from any of the queues 151-0 to 154-0 through the DRR technique, whereas the DRR scheduler 155-7 takes out a relay instruction from any of the queues 151-7 to 154-7 through the DRR technique.

Subsequently, the priority control transmission scheduler 156 reads packets from the stream memory 16 according to the relay instructions in the descending order of priority from among the relay instructions taken out by the DRR schedulers 155-0 to 155-7, and then outputs these packets to any of the transmission ports 12a to 12c (Step S112). Specifically, the priority control transmission scheduler 156 reads from the stream memory 16 a packet stored in the logical block indicated by the logical block number included in each relay instruction, and then outputs the packet to any of the transmission ports 12a to 12c. Also, when a relay instruction includes link information, the priority control transmission scheduler 156 reads from the stream memory 16 a packet stored in the logical block indicated by the logical block number included in the link information, and then outputs the packet to any of the transmission ports 12a to 12c.

After the packets are transmitted by the priority control transmission scheduler 156 to the transmission ports 12a to 12c, the congestion controlling unit 159 subtracts the size of the output packets from the total packet accumulated amount stored in the accumulated-amount storage unit 157 in association with the priority of each output packet (Step S113).

As has been explained above, the switch 10 according to the first embodiment includes for each of the transmission port modules 15a to 15c, a plurality of queues each provided in association with a combination of a priority and a VLAN number, and also includes the accumulated-amount storage unit 157 that stores a total size of packets accumulated in queues associated with the same priority and the threshold storage unit 158 that stores a threshold of the packet accumulated amount for each queue. When receiving a packet, the switch 10 determines whether to discard the packet based on the total packet accumulated amount stored in the accumulated-amount storage unit 157 in association with the priority set for the packet and the threshold stored in the threshold storage unit 158 in association with the storage-destination queue for the packet. With this, congestion control can be performed for each virtual network.

Also, in the switch 10 according to the first embodiment, packets even with different VLAN numbers can be stored in the same queue. Therefore, several virtual networks can be handled as one virtual network group, thereby allowing congestion control for each virtual network group.

[b] Second Embodiment

In the first embodiment, an example is explained in which the queue-number storage unit 173 stores a member port number, QID, and specified threshold for each priority. Alternatively, the member port number, QID, and specified threshold may be stored in different storage units in a distributed manner. Thus, in a second embodiment, an example is explained in which the member port number, QID, and specified threshold are stored in storage units in a distributed manner.

Figure 10:
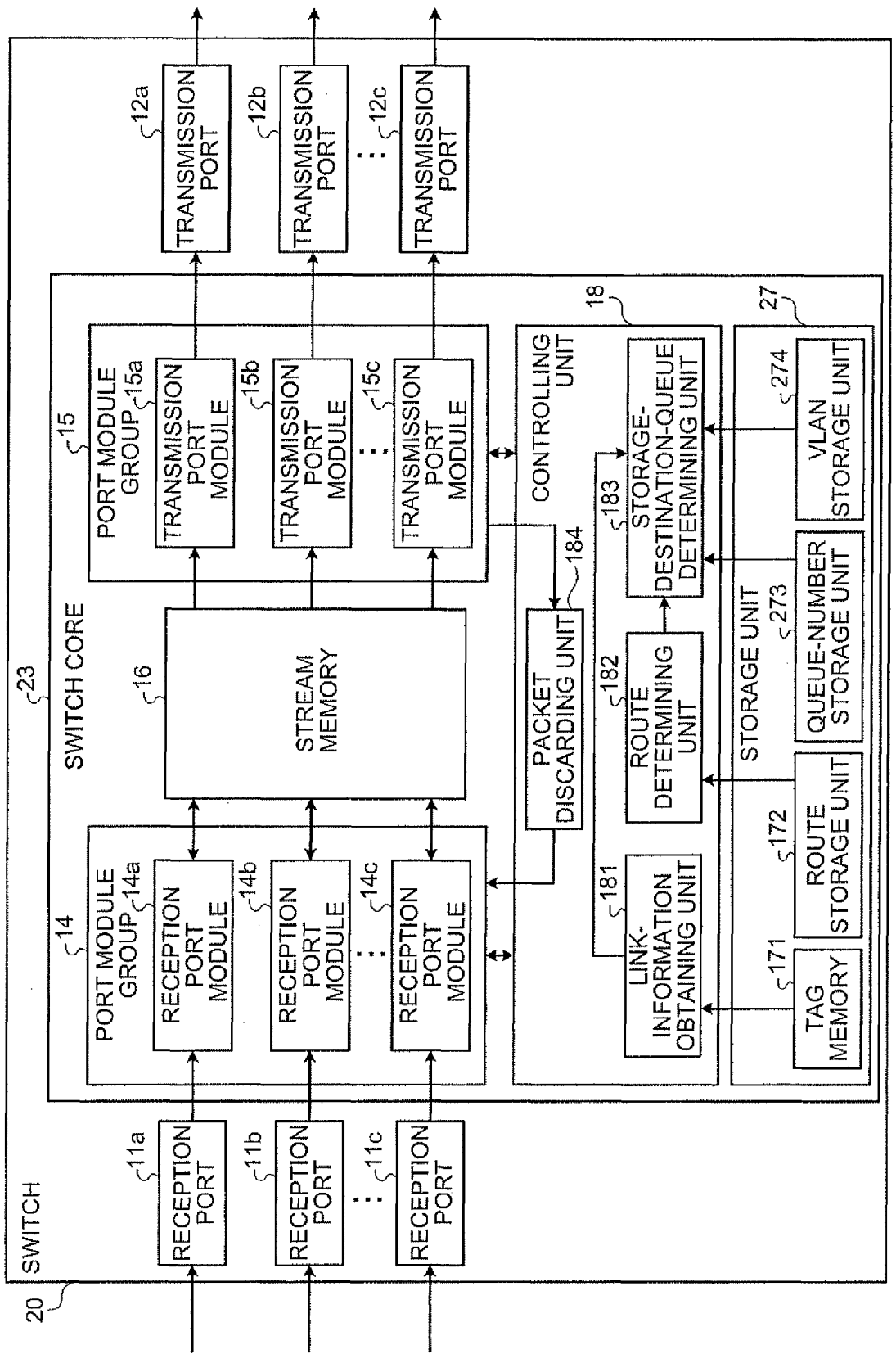
FIG. 10 is a block diagram of configuration of a switch according to a second embodiment.

First, the configuration of a switch 20 according to a second embodiment is explained. FIG. 10 is a block diagram of the configuration of the switch 20 according to the second embodiment. In the following, components having functions similar to those of the components depicted in FIG. 3 are provided with the same reference numerals, and are not explained herein in detail.

As depicted in FIG. 10, the switch 20 includes a switch core 23, which newly includes a storage unit 27 in place of the storage unit 17 included in the switch core 13 depicted in FIG. 3. In comparison with the storage unit 17 depicted in FIG. 3, the storage unit 27 newly includes a queue-number storage unit 273 and a VLAN storage unit 274 in place of the queue-number storage unit 173.

An example of the queue-number storage unit 273 is depicted in FIG. 11. As depicted in FIG. 11, the queue-number storage unit 273 includes items, such as VLAN umber, priority, QID, and specified threshold. An example of the VLAN storage unit 274 is depicted in FIG. 12. As depicted in FIG. 12, the VLAN storage unit 274 includes items, such as VLAN number and member port number.

As has been explained above, in the switch 20 according to the second embodiment, the queue-number storage unit 273 stores the QID and the specified threshold that can take different values depending on the priority, whilst the VLAN storage unit 274 stores the member port number not varied depending on the priority. With this, congestion control can be performed for each virtual network. Furthermore, the configuration of each storage unit can be simplified.

[c] Third Embodiment

Meanwhile, in the first and second embodiments, an example is explained in which the threshold corresponding to the specified threshold stored in the queue-number storage unit 173 or 273 is obtained from the threshold storage unit 158 for congestion control. Alternatively, such a specified threshold may not be provided. Also, in the first and second embodiments, an example is explained in which the total packet accumulated amount is stored in the accumulated-amount storage unit 157 in units of queue group. Alternatively, the packet accumulated amount may be stored for each queue. Thus, in a third embodiment, an example is explained in which the queue-number storage unit does not include a specified threshold and the accumulated-amount storage unit stores a packet accumulated amount for each queue.

Figure 13:
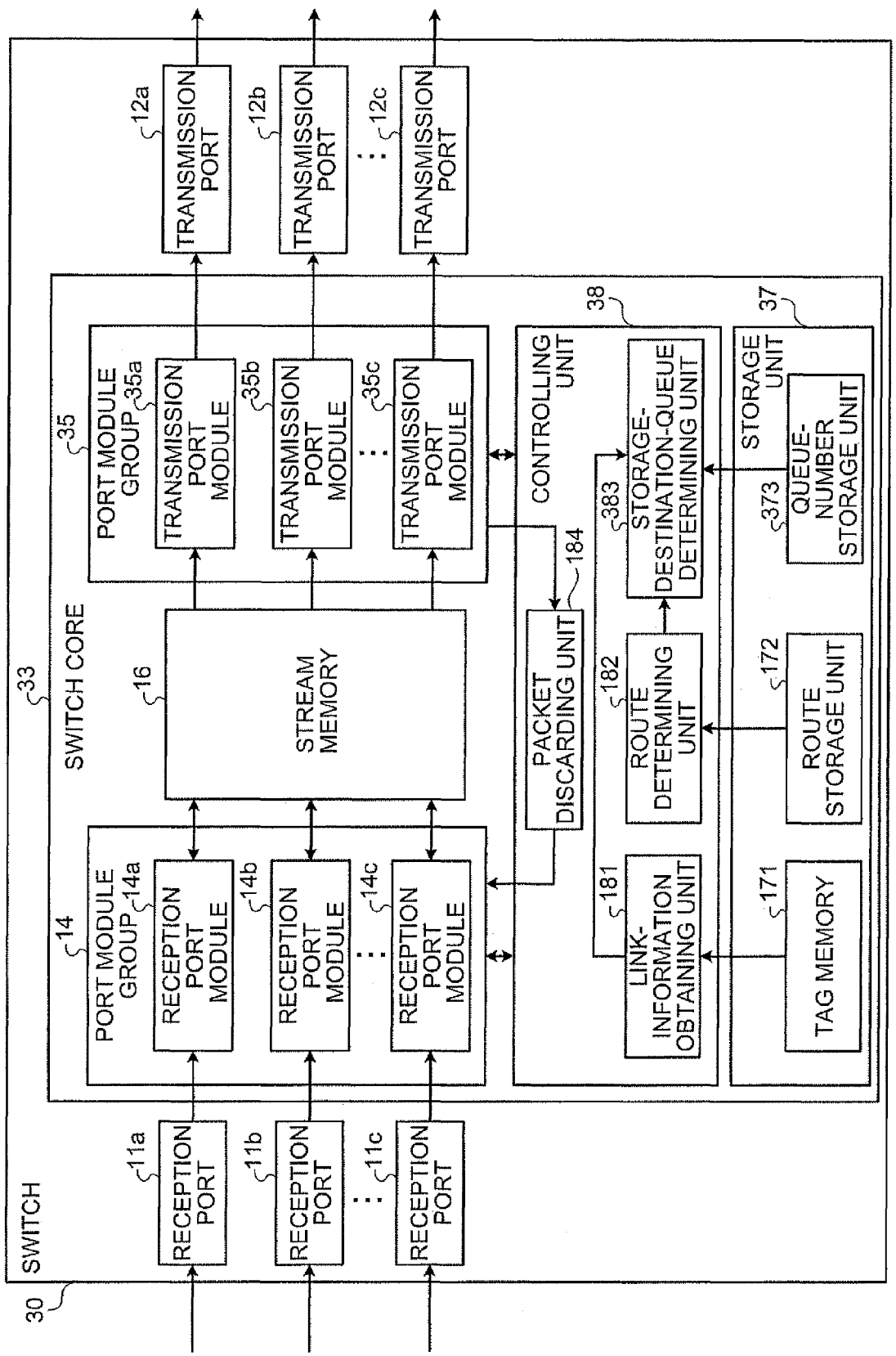
FIG. 13 is a block diagram of configuration of a switch according to a third embodiment.

First, the configuration of a switch 30 according to the third embodiment is explained. FIG. 13 is a block diagram of the configuration of the switch 30 according to the third embodiment. As depicted in FIG. 13, the switch 30 includes a switch core 33, which newly includes a port module group 35, a storage unit 37, and a controlling unit 38 in place of the port module group 15, the storage unit 17, and the controlling unit 18 included in the switch core 13 depicted in FIG. 3.

The port module group 35 includes transmission port modules 35a to 35c corresponding to the transmission ports 12a to 12c. The configuration of the transmission port modules 35a to 35c will be explained further below in detail.

In comparison with the storage unit 17 depicted in FIG. 3, the storage unit 37 newly includes a queue-number storage unit 373 in place of the queue-number storage unit 173. An example of the queue-number storage unit 373 is depicted in FIG. 14. As depicted in FIG. 14, the queue-number storage unit 373 does not include a specified threshold, in comparison with the queue-number storage unit 173 depicted in FIG. 5.

In comparison with the controlling unit 18 depicted in FIG. 3, the controlling unit 38 newly includes a storage-destination-queue determining unit 383 in place of the storage-destination-queue determining unit 183. The storage-destination-queue determining unit 383 is a processing unit that generates a relay instruction not including a specified threshold and outputs the generated relay instruction to any of the transmission port modules 35a to 35c.

Specifically, when header information is input from the port module group 14, the storage-destination-queue determining unit 383 obtains from the queue-number storage unit 373 a QID corresponding to a combination of the VLAN number and the priority set for this header information. Subsequently, the storage-destination-queue determining unit 383 generates a relay instruction including, for example, the input header information, a logical block number(s) indicating a logical block(s) where the packet having this header information is stored, the QID obtained from the queue-number storage unit 373, and the link information. Subsequently, the storage-destination-queue determining unit 383 outputs the generated relay instruction to any one of the transmission port modules 35a to 35c corresponding to any of the transmission ports 12a to 12c determined by the route determining unit 182.

Figure 15:
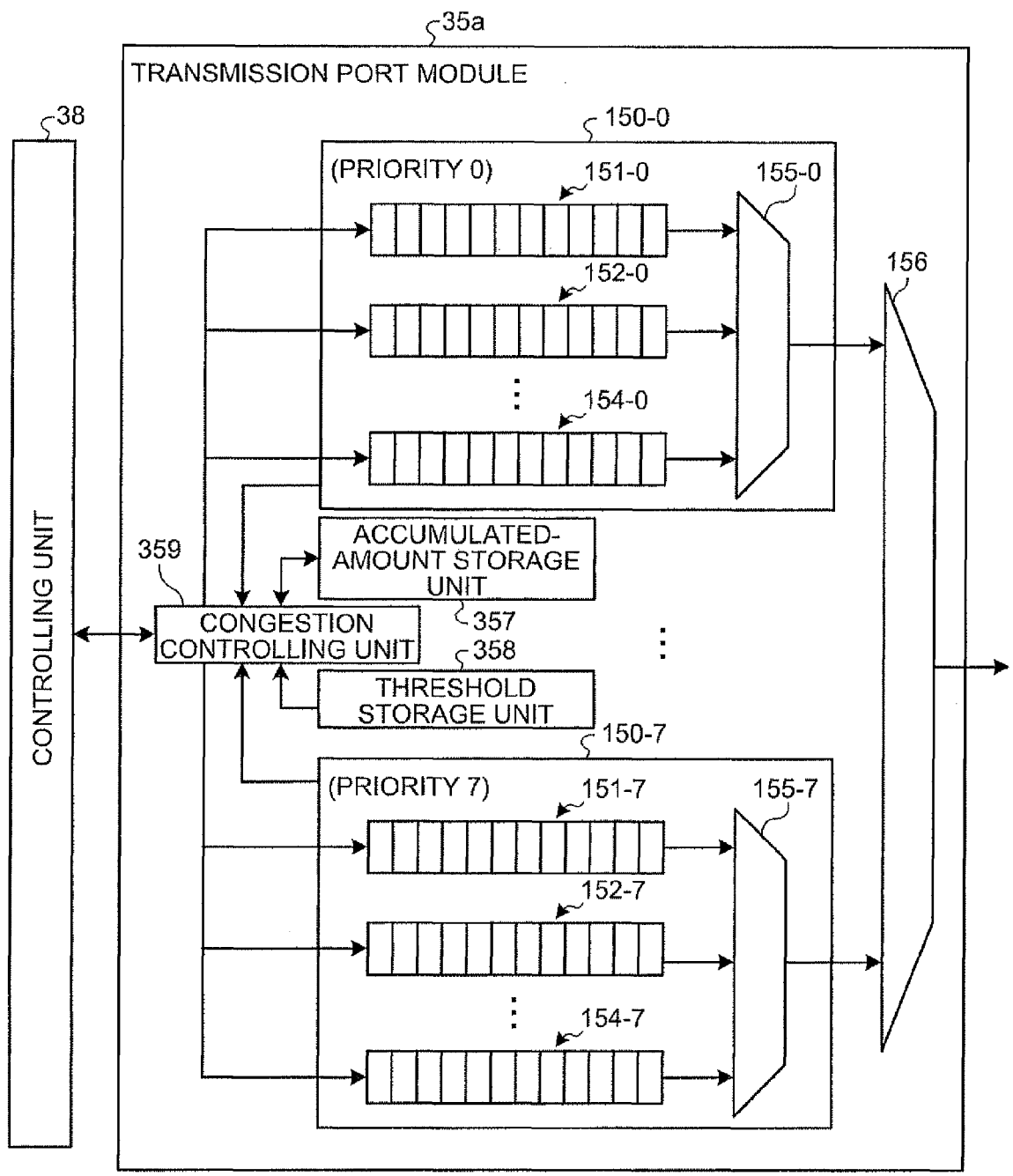
FIG. 15 is a block diagram of configuration of a transmission port module depicted in FIG. 13.

Next, the configuration of the transmission port modules 35a to 35c depicted in FIG. 13 is explained. FIG. 15 is a block diagram of the configuration of one of the transmission port modules 35a to 35c depicted in FIG. 13. Since the transmission port modules 35a to 35c have the same configuration, only the configuration of the transmission port module 35a is explained. Also, in the following, components having functions similar to those of the components depicted in FIG. 6 are provided with the same reference numerals, and are not explained herein in detail.

As depicted in FIG. 15, the transmission port module 35a includes queue groups 150-0 to 150-7, the priority control transmission scheduler 156, an accumulated-amount storage unit 357, a threshold storage unit 358, and a congestion controlling unit 359.

An example of the accumulated-amount storage unit 357 is depicted in FIG. 16. As depicted in FIG. 16, the accumulated-amount storage unit 357 stores a packet accumulated amount for each QID in association with the priority. That is, the first row of the accumulated-amount storage unit 357 depicted in FIG. 16 indicates that, from among queues included in the queue group 150-0 corresponding to a priority "0", a packet of "50 bytes" is accumulated in the queue 151-0 indicated by a QID "0", a packet of "100 bytes" is accumulated in the queue 152-0 indicated by a QID "1", a packet of "50 bytes" is accumulated in the queue 153-0 indicated by a QID "2", and a packet of "50 bytes" is accumulated in the queue 154-0 indicated by a QID "3".

Also, the eighth row of the accumulated-amount storage unit 357 depicted in FIG. 16 indicates that, from among queues included in the queue group 150-7 corresponding to a priority "7", a packet of "300 bytes" is accumulated in the queue 151-7 indicated by a QID "0", a packet of "500 bytes" is accumulated in the queue 152-7 indicated by a QID "1", a packet of "250 bytes" is accumulated in the queue 153-7 indicated by a QID "2", and a packet of "250 bytes" is accumulated in the queue 154-7 indicated by a QID "3".

An example of the threshold storage unit 358 is depicted in FIG. 17. As depicted in FIG. 17, the threshold storage unit 358 stores a threshold for each QID in association with the priority. That is, the first row of the threshold storage unit 358 depicted in the FIG. 17 indicates that, from among queues included in the queue group 150-0 corresponding to a priority "0", the threshold of the queue 151-0 indicated by the a QID "0" is "300 bytes", the threshold of the queue 152-0 indicated by the a QID "1" is "200 bytes", the threshold of the queue 153-0 indicated by the a QID "2" is "500 bytes", and the threshold of the queue 154-0 indicated by the a QID "3" is "1000 bytes".

Here, it is assumed in the configuration of the accumulated-amount storage unit 357 depicted in FIG. 16 and the configuration of the threshold storage unit 358 depicted in FIG. 17 that QIDs of the queues included in the queue groups 150-0 and others are assigned "0", "1", "2", and then "3" from the top. However, a unique QID can be assigned to every queue. In this case, the accumulated-amount storage unit 357 stores a packet accumulated amount in association with the QID, and the threshold storage unit 358 stores a threshold in association of the QID.

When a relay instruction is input from the storage-destination-queue determining unit 383, the congestion controlling unit 359 obtains a packet accumulated amount stored in the accumulated-amount storage unit 357 in association with a combination of the priority and the QID included in the input relay instruction. Subsequently, the congestion controlling unit 359 obtains a threshold stored in the threshold storage unit 358 in association with a combination of the priority and the QID included in the input relay instruction. Subsequently, the congestion controlling unit 359 compares the packet accumulated amount obtained from the accumulated-amount storage unit 357 and the threshold obtained from the threshold storage unit 358 with each other.

When the packet accumulated amount is smaller than the threshold, the congestion controlling unit 359 stores the relay instruction in a queue indicated by the QID included in the relay instruction from among the queues provided in association with the priority included in the relay instruction. On the other hand, when the packet accumulated amount is equal to or greater than the threshold, the congestion controlling unit 359 discards the relay instruction, and outputs discard information to the packet discarding unit 184.

As has been explained above, the switch 30 according to the third embodiment stores a packet accumulated amount and a threshold in association with a combination of the priority and the QID. Thus, congestion control can be performed for each virtual network. Also, the packet accumulated amount stored in each queue and the threshold set for each queue can be easily checked.

In the first to third embodiments, an example is explained in which the storage-destination-queue determining unit 183, for example, stores a relay instruction in a queue, and the transmission port module 15a, for example, takes out the relay instruction from the queue, and then a packet relaying process is performed according to the relay instruction. Such a packet relaying technique is merely an example, and a packet relaying process may be performed through another technique. For example, as explained by using FIG. 1, the switches 10, 20, and 30 may store packets themselves in each queue for packet relaying.

The process procedure, the control procedure, specific names, and information including various data and parameters can be arbitrarily changed unless otherwise specified. Furthermore, each component depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. Still further, all or arbitrary part of the process functions performed in each component can be achieved by a Central Processing Unit (CPU) and a program analyzed and executed on that CPU, or can be achieved as hardware with a wired logic.

Regarding the embodiments including the first to third embodiments, the following notes are further disclosed.

Note that other embodiments can be effectively achieved by applying the components, representations, and an arbitrary combination of the components of the relaying apparatus disclosed herein to a method, an apparatus, a system, a computer program, a recording medium, a data structure, and others.

According to the embodiments, an effect can be achieved such that congestion control can be performed for each virtual network.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relaying apparatus that relays a packet received from an apparatus belongs to a virtual network to the other apparatus, the relaying apparatus comprising:
 a reception port that receives a packet;
 a transmission port that transmits the packet;
 queues for registering the received packet, each of the queues corresponding to a priority indicative of an order of precedence for relaying the packet and a plurality of VLAN numbers handled as one virtual network group;
 a first memory that stores a total size of packets accumulated in all queues having same priority for each priority;
 a second memory that stores a threshold of the total size of packets set for each queue; and
 a controller that registers the received packet into a queue that corresponds to a plurality of VLAN numbers set for the received packet;
 wherein the controller compares the total size of packets accumulated in all queues corresponding to a priority set for the received packet with a threshold of the total size of packets set for a corresponding queue, and discards the received packet when the total size of packets accumulated in all queues corresponding to the priority of the received packet exceeds the threshold of the total size of packets set for the corresponding queue.

2. The relaying apparatus according to claim 1, wherein
the controller stores the packet in the queue when the total size of packets is smaller than the threshold, and discards the packet when the total size of packets is equal to or greater than the threshold, and
the relaying apparatus further includes a packet transmitting unit that transmits to the other apparatus the packet stored by the controller in the queue based on the priority associated with the queue.

3. The relaying apparatus according to claim 2, wherein
the packet transmitting unit includes a round-robin controlling unit that takes out packets from a plurality of queues associated with a same priority through a round-robin technique and a priority-control transmitting unit that transmits the packets taken out by the round-robin controlling unit to the other apparatus in a descending order of priority.

4. The relaying apparatus according to claim 3, wherein
the round-robin controlling unit takes out packets from the queues associated with the same priority through either one of a Deficit Round Robin technique and a Weighted Round Robin technique as the round-robin technique.

5. A relaying method for relaying a packet received from an apparatus belongs to a virtual network to the other apparatus, the relaying method comprising:
registering the received packet in a queue that corresponds to a plurality of VLAN numbers set for the received packet;
comparing a total size of packets accumulated in all queues corresponding to a priority set for the received packet with a threshold of the total size of packets set for a corresponding queue,
discarding the received packet when the total size of packets accumulated in all queues corresponding to the priority of the received packet exceeds the threshold of the total size of packets set for the corresponding queue, wherein
each of queues for registering the received packet corresponds to a priority indicative of an order of precedence for relaying the packet and a plurality of VLAN numbers handled as one virtual network group,
the total size of packets indicative of size of packets accumulated in the queues has the same priority, and
the threshold of the total size of packets is set for each queue.

6. The relaying method according to claim 5, wherein
the discarding includes storing the packet in the queue determined by the comparing when the total packet size is smaller than the threshold, and discards the packet when the total packet size is equal to or greater than the threshold, and
the method further includes
transmitting to the other apparatus the packet stored in the discarding in the queue based on the priority associated with the queue.

* * * * *